United States Patent [19]

Jacocks et al.

[11] 4,398,415

[45] Aug. 16, 1983

[54] SWING LINK FLEXIBLE WIND TUNNEL NOZZLE

[75] Inventors: James L. Jacocks, Tullahoma; Henry L. Henderson, Winchester, both of Tenn.

[73] Assignee: The United States of America as represented by the Secretary of the Air Force, Washington, D.C.

[21] Appl. No.: 329,443

[22] Filed: Dec. 10, 1981

[51] Int. Cl.³ .............................................. G01M 9/00
[52] U.S. Cl. ....................................... 73/147; 138/45; 138/46
[58] Field of Search ........................ 73/147; 138/45, 46

[56] References Cited

U.S. PATENT DOCUMENTS

| | | | |
|---|---|---|---|
| 2,737,019 | 3/1956 | Billman | 60/39.29 |
| 2,791,240 | 5/1957 | Storms, Jr. et al. | 138/45 |
| 2,831,505 | 4/1958 | Menard | 138/45 |
| 2,933,922 | 4/1960 | Davis | 73/147 |
| 2,939,274 | 6/1960 | Olson | 138/45 |
| 3,045,705 | 7/1960 | Hausammann | 138/45 |
| 3,104,680 | 9/1963 | Orlin | 138/45 |
| 3,180,140 | 4/1965 | Mickey | 73/147 |
| 3,443,598 | 5/1969 | Pierce | 138/45 |
| 3,612,106 | 10/1971 | Leon et al. | 138/45 |

Primary Examiner—Donald O. Woodiel

Attorney, Agent, or Firm—Donald J. Singer; Jacob N. Erlich

[57] ABSTRACT

A flexible duct for conveying a gaseous flow, with the duct useable as the flexible nozzle in a wind tunnel. The duct includes a flexible plate member which is attached at the downstream end to a frame support member, with the upstream end of the flexible plate member being slideable and pivotable upon a member attached to the frame support member. A plurality of swing link members in spaced-apart relationship are pivotally connected at one end to the flexible plate member, and pivotally connected at the other end to a translatable and rotatable cradle-like member which is supported by crank members from the frame support member. An actuator is used to selectively move the cradle-like member. The resultant movement of the cradle-like member causes the flexible plate member to deflect, resulting in predetermined contours (and profiles) of the flexible plate member. If the duct is used as the flexible nozzle of a wind tunnel, this contouring of the flexible plate member allows generation of a large range of uniform velocities at the downstream exit end of the duct which is in communication with the testing section of the wind tunnel. Unlike the Pierce invention which was very restricted in the range of velocities attainable, this duct can be used to provide a large range of uniform velocities including supersonic.

6 Claims, 3 Drawing Figures

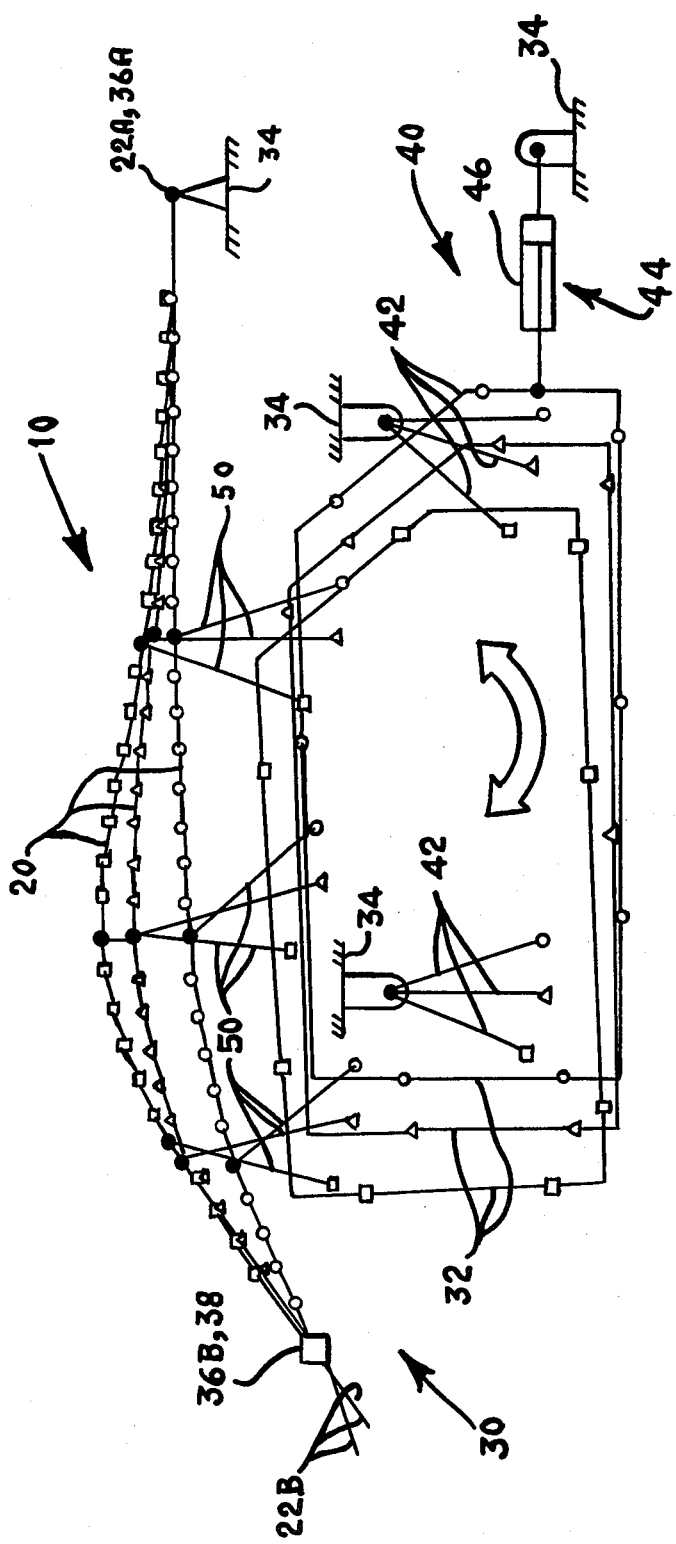

SWING LINK FLEXIBLE WIND TUNNEL NOZZLE

STATEMENT OF GOVERNMENT INTEREST

The invention described herein may be manufactured and used by or for the Government for governmental purposes without the payment of any royalty thereon.

BACKGROUND OF THE INVENTION

This invention relates to a flexible duct for conveying a gaseous flow and, more particularly, to a flexible duct which is structurally useable as the flexible nozzle of a wind tunnel to cause, maintain, and control a uniform gaseous flow over a wide range of nozzle exit velocities from the subsonic to the supersonic. In this regard, it is to be noted and remembered that the exit of a wind tunnel nozzle leads to, and sometimes coincides with, the entrance of the test section of the wind tunnel.

Current practice for contouring the flexible nozzle of the wind tunnel requires the use of a plurality of actuators and/or jacks which are pivotally attached to a flexible wall plate member and to fixed trunnions; position measurement devices for each actuator and/or jack; stress monitoring devices to prevent damage to the flexible wall plate member; and, a complex control system to command movement of each actuator in concert. It is fair and accurate to say that the conventional flexible nozzle assembly requires considerable maintenance to assure accurate contour positioning, and that the probability of mechanical failure to maintain the selected and needed contour positioning is excessively high.

It is here to be noted that an approach which significantly simplifies the problem of controlling the selected contouring of the flexible nozzle is set forth in U.S. Pat. No. 3,443,598 which was issued to Pierce on May 13, 1969. Therein, the flexible wall plate member is supported by multiple pivoted links which are attached to fixed trunnions; translation of the flexible wall plate member and of the test section deforms the flexible plate into predetermined contour shapes; only one actuator per plate member is required; and, as a result, a correspondingly very simple control system is sufficient.

The primary advantages of the approach and apparatus disclosed in the Pierce patent, as compared to the conventional approach and apparatus used to contour flexible wind tunnel nozzles, are: the elimination of the need for stress monitoring equipment; and, greatly reduced maintenance requirements. However, the approach and apparatus disclosed in the Pierce patent are deficient in three major aspects, namely: (1) the test section movement, as Mach number is changed, results in difficulties with respect to test article support within the test section; (2) the physical limits on travel of the flexible wall plate member restricts the range of Mach numbers that are obtainable; and, (3) the inherent small angle, between the flexible wall plate member and the links at low Mach number contours, results in excessive deflection under normal operating conditions. Elimination of these deficiencies is the basis of the instant invention, which constitutes a significant advance in the state-of-the-art.

SUMMARY OF THE INVENTION

The instant invention is a unique flexible duct for conveying a gaseous flow. The inventive flexible duct is preferably structurally useable as the flexible nozzle of a wind tunnel; and, when it is so used, the nozzle causes, maintains, and controls a uniform gaseous flow throughout a large range of velocities, including supersonic. As compared to conventional wind tunnel flexible nozzles, the instant invention requires a much more simple control system, fewer positional movements, no stress monitoring, and reduced maintenance. As compared to other swing link nozzles, such as that disclosed by Pierce, the instant invention provides increased rigidity, and better uniformity of the flow over a larger velocity range with a fixed test section.

Accordingly, it is an object of the instant invention to provide a flexible walled duct for conveying a gaseous flow, wherein this duct is useable as the flexible nozzle of a wind tunnel.

It is another object of this invention to provide a flexible duct/nozzle as hereinabove described which will only require, when compared with prior art conventional (i.e., not swing link) flexible wind tunnel nozzles, a more simple control system, no stress monitoring system, and little if any maintenance.

It is still another object of the instant invention to provide a flexible duct/nozzle that will in turn provide, as compared to prior art swing link flexible wind tunnel nozzles, increased rigidity and better uniformity of the flow over a larger velocity range with a fixed test section.

These objects of this invention, as well as other objects relative thereto, will become readily apparent after a consideration of the description of the invention, together with reference to the contents of the Figures of the drawing.

DESCRIPTION OF THE DRAWING

FIG. 3 is a schematic representation of the preferred embodiment to illustrate the concept conceived and used to change the contour of a flexible plate member of the preferred embodiment and to attain a desired contour thereof.

DESCRIPTION OF THE PREFERRED EMBODIMENT

Figure 1:
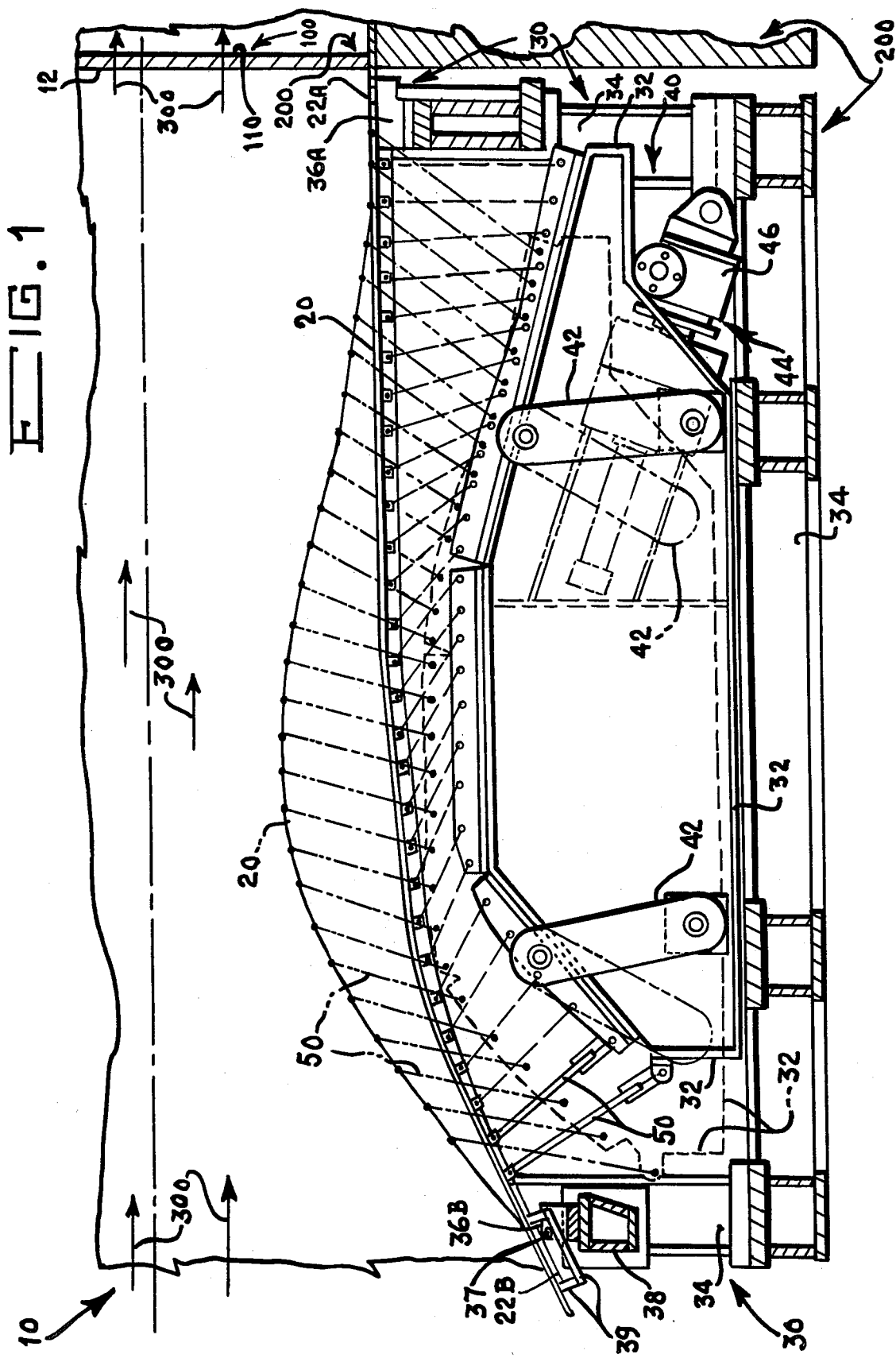
FIG. 1 is a side elevation view, in simplified pictorial and schematic form, partially fragmented and partially in cross section, of the preferred embodiment of the instant invention, while in use as the flexible nozzle of a wind tunnel.
Figure 2:
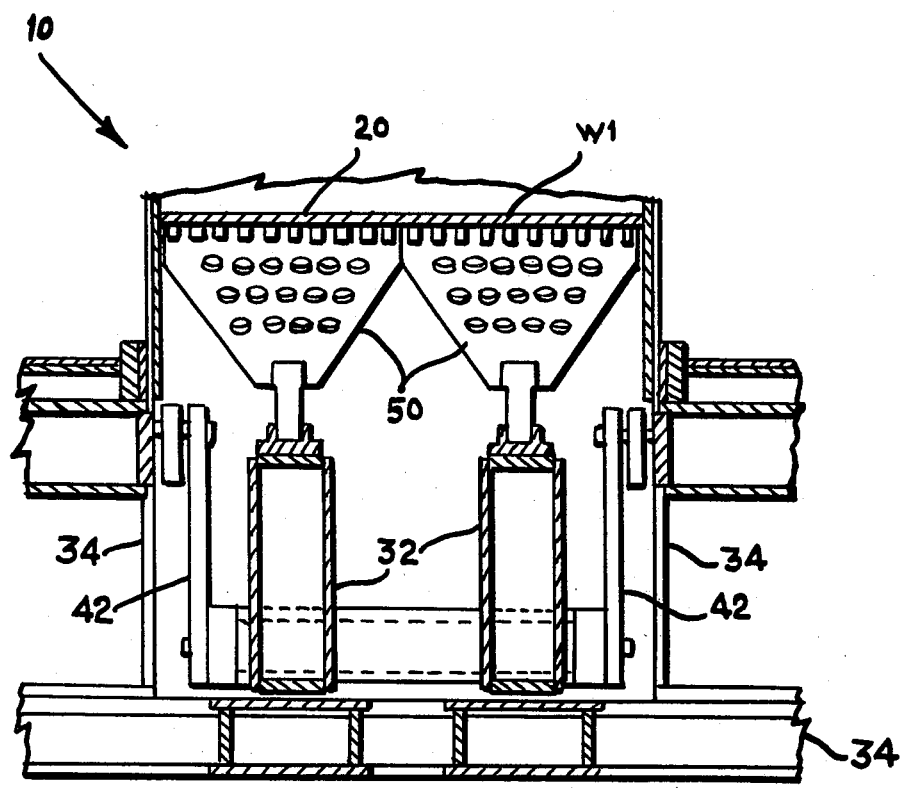
FIG. 2 is a transverse view, in simplified pictorial and schematic form, partially in cross section and partially fragmented, of the preferred embodiment of the instant invention.

As a preliminary matter, it is to be noted that the instant invention 10, FIGS. 1-3, inclusive, is a flexible duct for conveying a gaseous flow (such as 300, FIG. 1). However, the duct 10 also is useable, in one adaptation, as the flexible nozzle of a wind tunnel (such as 200, FIG. 1) having a test section (such as 100, FIG. 1). Accordingly, the inventive flexible duct 10, FIGS. 1-3, will be shown and described at times herein while used as the flexible nozzle of the wind tunnel 200, FIG. 1. Such showing, description, and use are by way of illustration only, and not because of any limitation. Additionally, in the interest of maintaining simplicity of the Figures of the drawing, only the lower half of the inventive flexible gas-conveying duct 10 is shown in the Figures. In this regard, it is to be noted that the upper half of the Figures can be, and preferably is, symmetrical to the lower half, but it need not be.

With reference to FIGS. 1-3, inclusive, the preferred embodiment 10 of the instant invention comprises, in the most basic and generic structural form: a flexible plate member 20 having a changeable contour (or profile), with the flexible plate member 20 defining a wall of the duct 10, such as bottom wall W1, best seen in FIG. 2; and, means 30 for changing the contour or profile of the plate member 20 (and, of course, bottom wall W1), with this means 30 operably connected to the flexible plate member 20.

The means 30 for changing the contour (and profile) of the flexible plate member 20 includes: a translatable and rotatable cradle-like member 32 which is connected to the flexible plate member 20; and, means 40 for applying a load to the cradle-like member 32 so as to move cradle-like member 32 and thereby flexible plate member 20 to a plurality of contours, one of which being shown in phantom in FIG. 1 of the drawing.

The means 30 for changing the contour (and profile) of the flexible plate member 20 further includes a support frame member 34 having a first end 36A to which one end 22A of the flexible plate member 20 is attached; and, a second end 36B to which another end 22B of plate member 20 is attached by an arrangement which permits free rotation and translation of plate member 20 to take place with respect thereto. Such an arrangement allows flexibile plate member 20 to assume the predetermined contours illustrated schematically in FIG. 3 of the drawing.

More specifically, however, but not intendend as a limitation of this invention, the above-mentioned arrangement may include an elongated pin-like element 37 formed integral with or secured to a fixture member 38 which in turn is attached to the second end 36B of support frame member 34. A slotted retained 39 may be formed or mounted upon end 22B of plate member 20 so as to encompass pin-like member 37 thereby permitting the free rotation and translation of plate member 20 to occur.

The means 40 for applying a load to the translatable and rotatable cradle-like member 32 includes: a plurality of crank members 42 pivotally supporting the cradle-like member 32 from the support frame member 34 as clearly depicted in FIGS. 1 and 2 of the drawing; and, means 44 in the form of, for example, a conventional pneumatically or electrically driven actuator 46 for moving cradle-like member 32. Although the specific manner of mounting actuator 46 may vary, it is preferable to fixedly secure one end thereof to frame 34 and the other end to cradle-like member 32.

Referring again to the means 30 for changing the contour (and profile) of the flexible plate member 20, that means 30 further includes a plurality of swing link members 50 (shown in FIGS. 1 and 2) each having a first end and a second end, with the first end pivotally connected to the flexible plate member 20, and with the second end pivotally connected to the cradle-like member 32.

Now, with reference to FIG. 1, and also with reference to the comments hereinbefore as to the useability of the inventive gas-conveying duct 10 as a component of a wind tunnel (such as 200, FIG. 1), it is to be noted that the duct 10 has a downstream exit 12 for the gaseous flow 300; and, that when the duct 10 is to be used as the flexible nozzle of the wind tunnel 200, the downstream exit 12 of the duct 10 is connected by suitable means to the entrance 110 of the test section 100 of the wind tunnel 200. In this regard, it is important to note that in the Pierce invention, when the flexible plate is translated to rotate the links and change the contour of the duct/nozzle to change the Mach number which is to be attained, the location and nozzle height at the test entrance section also changes, which necessitates significant effort to compensate. On the other hand, the instant invention 10 provides (because of its structure) an exit 12 of fixed (i.e., unchanging) dimensions and location, irrespective of any change made in the contour (or profile) of the flexible plate member 20 which is made to change the Mach number to be attained. Therefore, the instant invention 10 permits testing without expending significant effort to compensate or make allowance for changes in nozzle height and location.

MANNER OF OPERATION OF THE PREFERRED EMBODIMENT

The manner of operation, and of use, of the preferred embodiment 10 of the instant invention can be easily ascertained by any person of ordinary skill in the art from the foregoing description, coupled with reference to the contents of the Figures of the drawing.

For others, the following explanation is given, in conjunction with reference to the Figures, particularly FIG. 3, wherein the conceptual basis of the instant invention 10 is schematically represented. The flexible plate member 20 is attached to the support frame member 34 at first end 36A in a manner which allows controlled slope of the duct exit 12, and is supported at second end 36B in a manner which permits free rotation and translation. At arbitrary locations between the frame support ends 36A and 36B, the flexible plate member 20 is supported by the plurality of links 50 pivotally attached to the cradle-like member 32 which is supported by pivotal crank members 42 connected to the support frame member 34. The cradle-like member 32 is positioned by the actuator 46, and this movement results in the deflection of the flexible plate member 20 into predetermined contours (and profiles). As depicted schematically in FIG. 3 of the drawing the length dimensions and pivot center locations of the links 50 and of the cranks 42 are defined by three contours (and profiles) and the plane motion of the cradle member 32. The motion of the cradle-like member 32 is selected to yield link and crank dimensions and associated pivot center locations that can function without interference within marginal space constraints. Three plate contours (and profiles) are calculated that will yield uniform flow at the duct (or nozzle) exit 12, with the exit Mach numbers being chosen in such a way that flow non-uniformity at all other Mach numbers is minimized. The minimum Mach number for design (and structural) purposes is unity (i.e., 1), which places the minimum cross-sectional flow area at the exit 12. This contour is then useable for all test velocities from zero through sonic. Supersonic test conditions are then obtained by movement of the actuator 46 to predefined settings as a function of the desired Mach number.

CONCLUSION

It is abundantly clear from all of the foregoing, and from the contents of the Figures of the drawing, that the stated objects of the instant invention 10, as well as other objects related thereto, have been achieved.

It is to be noted that, although there have been described and shown the fundamental and unique features of the instant invention, as applied to a preferred embodiment 10 and to a particular adaptation (i.e., use as a flexible nozzle of a wind tunnel), various other embodiments, variations, adaptations, substitutions, additions, omissions, and the like may occur to and can be made by those of ordinary skill in the art.

What is claimed is:

1. A flexible duct for conveying a gaseous flow, comprising:
    a. means having a changeable contour for defining a wall of said duct; and
    b. means, operably connected to said wall defining means for changing said contour of said wall defining means wherein this means includes: a cradle-like member connected to said wall defining means, said cradle-like member being capable of translatable and rotatable movement; and, means for applying a load to said cradle-like member in order to cause said movement of said cradle-like member to take place thereby changing said contour of said wall of said duct.

2. A flexible duct for conveying a gaseous flow as defined in claim 1 wherein said wall defining means comprises a flexible plate member.

3. A flexible duct for conveying a gaseous flow, as set forth in claim 2, wherein said means for changing said contour of said flexible plate member further includes:
    a. a support frame member having a first end to which a first end of said flexible plate member is attached; and
    b. means attached to a second end of said support frame member for supporting a second end of said flexible plate member in a manner that permits free rotation and translation thereof with respect to said second end of said frame member.

4. A flexible duct for conveying a gaseous flow, as set forth in claim 3, wherein said means for applying a load to said translatable and rotatable cradle-like member includes:
    a. a plurality of crank members pivotally supporting said cradle-like member from said support frame member; and
    b. means, operably associated with said cradle-like member, for actuating said cradle-like member, with this means including an actuator.

5. A flexible duct for conveying a gaseous flow, as set forth in claim 4, wherein said means for changing said contour of said flexible plate member further includes a plurality of swing link members each having a first end and a second end, with said first end of each of said swing link members pivotally connected to said flexible plate member, and with said second end of each of said swing link members pivotally connected to said cradle-like member.

6. A flexible duct for conveying a gaseous flow, as set forth in claim 5, wherein said duct has a downstream exit for said gaseous flow, and wherein said duct is connected at said exit to the entrance of a test section of a wind tunnel, thereby said duct structurally functions as the flexible nozzle of said wind tunnel.

* * * * *